United States Patent
Pawelski et al.

(10) Patent No.: US 9,884,733 B1
(45) Date of Patent: Feb. 6, 2018

(54) CONVEYED BOTTLE GUIDE APPARATUS AND METHOD

(71) Applicant: Flexibility Engineering, LLC, Loveland, CO (US)

(72) Inventors: Joseph Pawelski, Fort Collins, CO (US); Thomas Ingraham, Fort Collins, CO (US); Steven Walker, Loveland, CO (US)

(73) Assignee: Flexibility Engineering, LLC, Loveland, CO (US)

( * ) Notice: Subject to any disclaimer, the term of this patent is extended or adjusted under 35 U.S.C. 154(b) by 0 days.

(21) Appl. No.: 15/675,425

(22) Filed: Aug. 11, 2017

(51) Int. Cl.
*B65G 51/03* (2006.01)
*B65G 21/20* (2006.01)

(52) U.S. Cl.
CPC ....... *B65G 51/035* (2013.01); *B65G 21/2072* (2013.01); *B65G 2201/0247* (2013.01)

(58) Field of Classification Search
CPC .................................................. B65G 51/035
USPC ........ 406/88, 197; 414/676; 198/681, 836.2, 198/836.3
See application file for complete search history.

(56) References Cited

U.S. PATENT DOCUMENTS

| | | | | |
|---|---|---|---|---|
| 3,901,180 A | * | 8/1975 | Allen ...................... | B05C 19/02 118/421 |
| 3,934,993 A | * | 1/1976 | Bowman .............. | B65G 37/005 118/63 |
| 4,998,399 A | * | 3/1991 | Lutzke .................... | B65B 21/06 198/419.3 |
| 5,421,678 A | * | 6/1995 | Aidlin .................. | B65G 51/035 198/836.3 |
| 5,437,521 A | * | 8/1995 | Ouellette ............. | B65G 51/035 406/194 |
| 5,516,239 A | * | 5/1996 | Warren ................ | B65G 51/035 406/88 |
| 5,542,789 A | * | 8/1996 | Aidlin ................ | B65G 21/2072 406/88 |
| 5,853,080 A | * | 12/1998 | Patois .................... | B65G 15/14 198/493 |
| 5,937,998 A | * | 8/1999 | Priero .................... | B65G 17/26 198/678.1 |
| 5,951,211 A | * | 9/1999 | Ouellette ............. | B65G 51/035 406/88 |
| 6,024,518 A | * | 2/2000 | Ouellette ............. | B65G 51/035 406/88 |
| 6,033,156 A | * | 3/2000 | Marti Sala ........... | B65G 51/035 406/86 |
| 6,062,773 A | * | 5/2000 | Ouellette ............. | B65G 51/035 406/79 |
| 6,109,426 A | * | 8/2000 | Messer, III .......... | B65G 15/105 198/604 |

(Continued)

*Primary Examiner* — Joseph A Dillon, Jr.
(74) *Attorney, Agent, or Firm* — Santangelo Law Offices, PC

(57) ABSTRACT

Embodiments of the inventive technology disclosed herein may improve efficiency of conveyed bottle apparatus by providing bottle jam prevention guides that may be rotatable, whether freely or in response to a motorized force. Such guides may force downward a bottle that undergone excessive swing in a forward and/or rearward direction, and thus has jammed or is in an incipient jam condition. Advantages may include not only increased efficiency of a conveyed bottle process, but also reduction or even elimination of chatter.

35 Claims, 17 Drawing Sheets

(56) References Cited

U.S. PATENT DOCUMENTS

| | | | |
|---|---|---|---|
| 6,190,094 B1 * | 2/2001 | Rediess | B65G 51/035 406/19 |
| 6,250,851 B1 * | 6/2001 | Ouellette | B65G 15/14 198/463.3 |
| 6,360,880 B1 * | 3/2002 | Ouellette | B65G 51/035 198/626.1 |
| 6,368,027 B1 * | 4/2002 | Trenel | B65G 51/035 406/83 |
| 6,382,882 B1 * | 5/2002 | Ouellette | B65G 51/035 33/613 |
| 6,386,799 B1 * | 5/2002 | Ouellette | B65G 51/035 406/26 |
| 6,390,737 B2 * | 5/2002 | Farquhar | B65G 51/035 406/195 |
| 6,478,514 B1 * | 11/2002 | Ouellette | B65G 51/035 406/86 |
| 6,488,449 B1 * | 12/2002 | Laquay | B65G 51/035 198/465.4 |
| 6,494,646 B1 * | 12/2002 | Sala | B65G 51/035 406/88 |
| 6,568,882 B2 * | 5/2003 | Lanfranchi | B65G 21/2072 198/454 |
| 6,612,785 B1 * | 9/2003 | Ouellette | B65G 51/035 198/836.3 |
| 6,685,401 B1 * | 2/2004 | de Almeida Rodrigues | B65G 51/035 406/11 |
| 6,736,573 B1 * | 5/2004 | Simkowski | B65G 21/2072 198/836.4 |
| 6,805,230 B2 * | 10/2004 | Correggi | B65G 47/088 198/427 |
| 6,889,823 B2 * | 5/2005 | Delaporte | B65G 21/20 198/836.1 |
| 6,890,128 B2 * | 5/2005 | Seidl | B65G 51/035 406/88 |
| 7,810,629 B2 * | 10/2010 | Kronseder | B65G 17/385 198/347.1 |
| 7,815,041 B2 * | 10/2010 | Guenther | B65G 21/2072 198/836.1 |
| 7,891,480 B2 * | 2/2011 | Lemaistre | B29C 49/4205 198/465.4 |
| 8,033,762 B2 * | 10/2011 | Lopez | B65G 47/648 406/182 |
| 8,109,697 B2 * | 2/2012 | Glotzl | B65G 51/035 406/87 |
| 8,132,665 B2 * | 3/2012 | Pawelski | B65G 21/2072 198/836.1 |
| 8,172,290 B2 * | 5/2012 | Nishino | A61L 2/087 198/803.7 |
| 8,205,740 B2 * | 6/2012 | Dragon | B65G 21/2072 198/466.1 |
| 8,226,331 B2 * | 7/2012 | Derouault | B65G 51/035 193/31 A |
| 8,770,392 B2 * | 7/2014 | Berger | B65G 21/16 198/813 |
| 8,801,341 B2 * | 8/2014 | Turck | B65G 51/035 406/197 |
| 9,004,821 B2 * | 4/2015 | Garner | B65G 51/03 406/87 |
| 9,169,086 B1 * | 10/2015 | Burchell | B65G 51/035 |

* cited by examiner

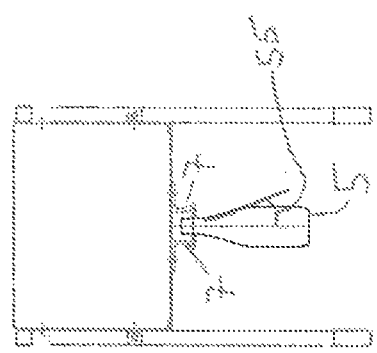
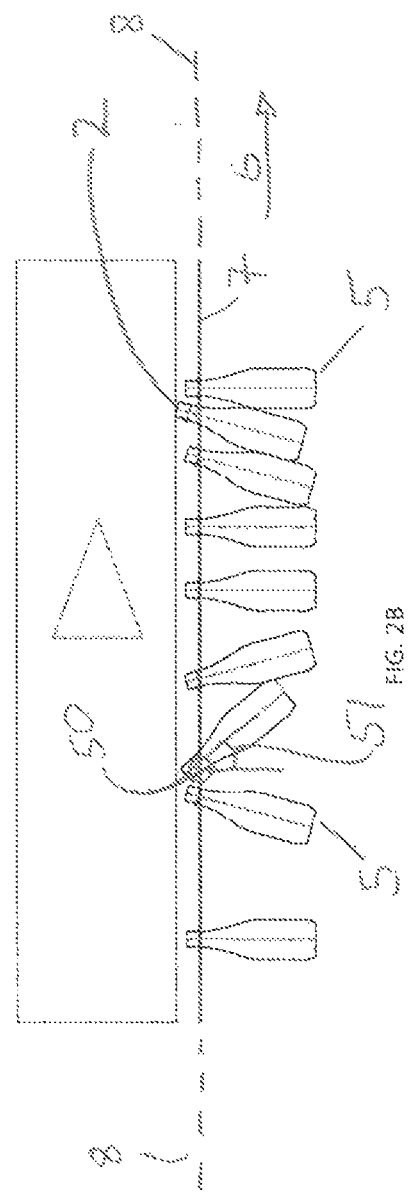
FIG. 2A
FIG. 2B

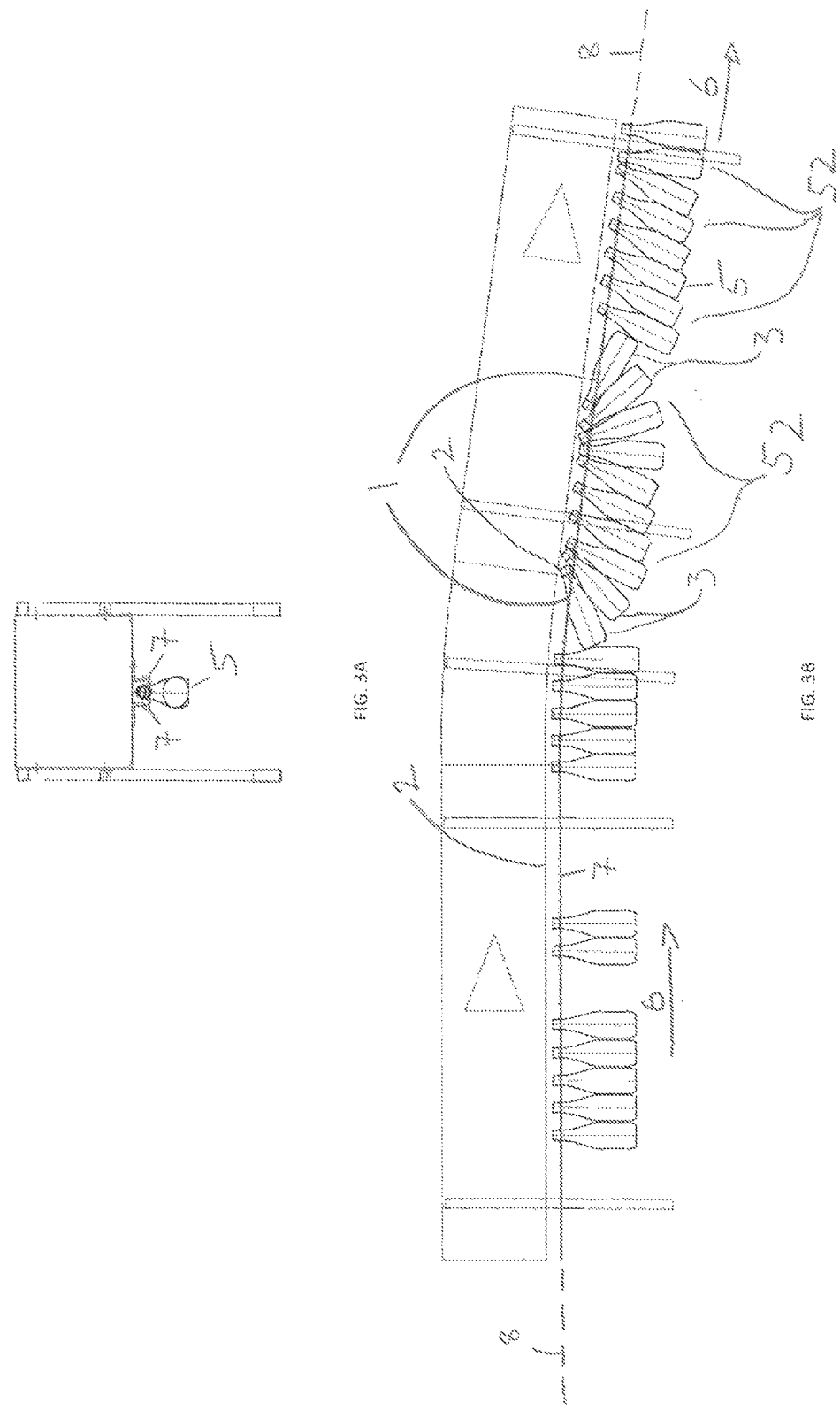

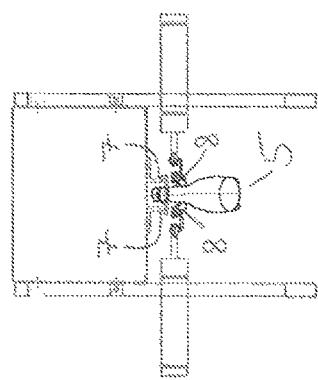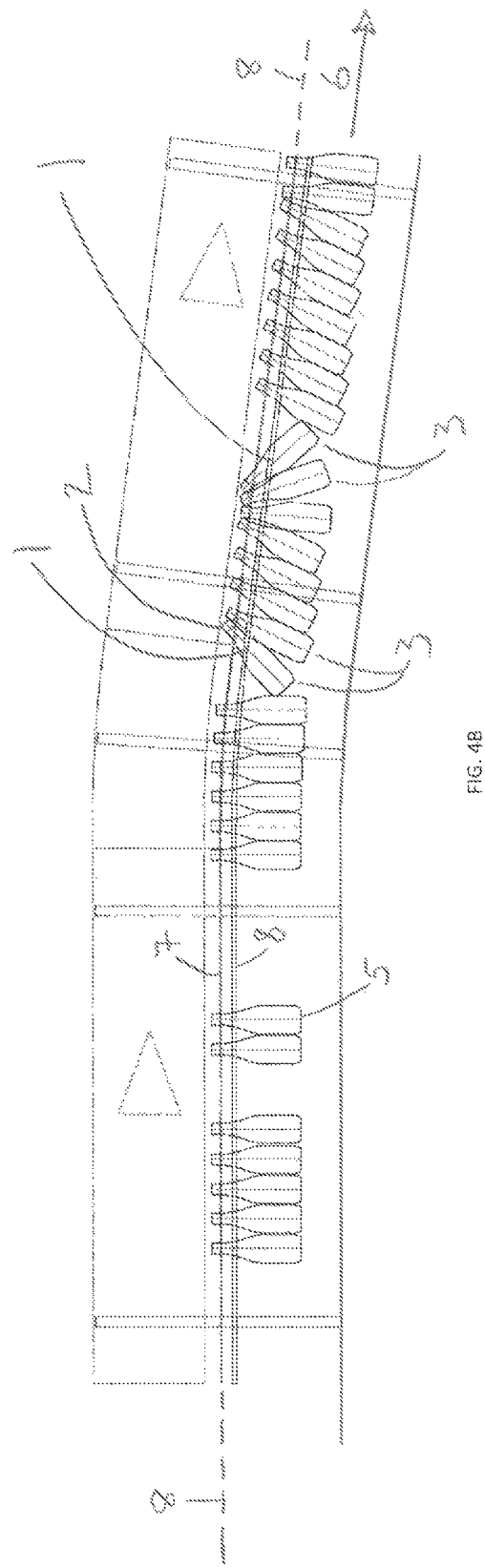
FIG. 4A
FIG. 4B

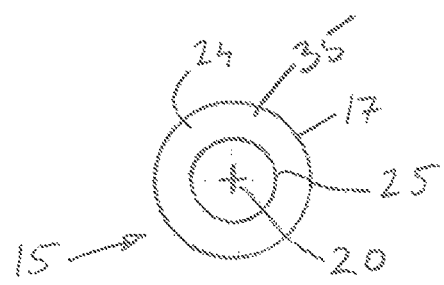 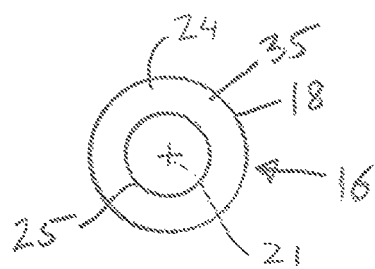
FIG. 15A
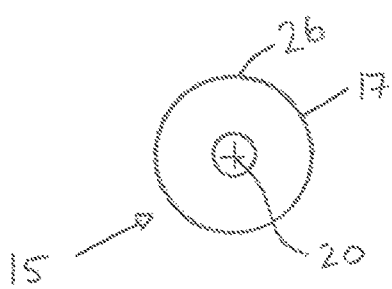 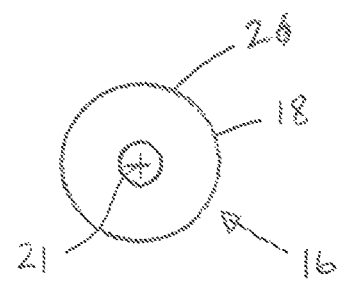
FIG. 15B
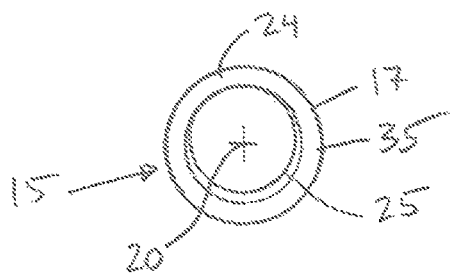 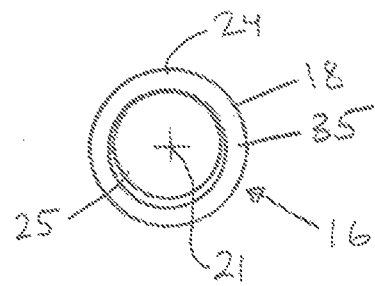
FIG. 15C
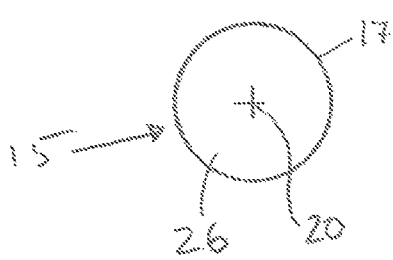 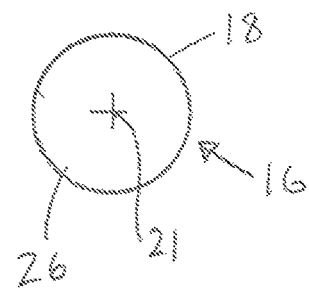
FIG. 15D

CONVEYED BOTTLE GUIDE APPARATUS AND METHOD

Conveyance of bottles for processing such as filling, labeling, capping, etc., has been well known for years. But it is an "art" of sorts that has yet to be perfected. Among its most concerning problems is bottle jams, where, for whatever particular reason, a bottle or bottles become jammed in some manner. Such bottle(s), once jammed, can no longer be conveyed as intended; often they are stationary, and wedged in place. Of course, such a jam can cause bottles to back up behind it, preventing conveyance and processing of any such obstructed bottles. As can easily be appreciated, a single bottle jam can have a significant impact on a facility's bottle processing efficiency.

Many bottle jams 1 occur as a result of bottle swinging where the bottle rotates about a bottle swing axis that is perpendicular to the direction in which the bottle is conveyed and located substantially where neck guides support the bottle during its conveyance. Each bottle may have its own swing axis 50 along which it may swing; such axis moves with the bottle as it is conveyed. Initiating such swinging, at times, is what may be termed a slug collision, an event where a plurality of singulated bottles that are side by side and touching each other (a slug 52), and that move together, collide with one or more bottles (slugged or not) that are moving at a different speed. Such collision can cause a bottle or bottles to swing. Typically, at least the bottle that is at a far end of the slower moving slug (or, where one bottle is on the receiving end of the collision, that single bottle) will swing about its swing axis. If that swinging is large enough, or, perhaps as increased due to a motion force (a pneumatic force, as but one example), becomes large enough, for a part of the bottle (e.g., a shoulder) to become stuck (e.g., wedged, perhaps due to bottle deformation) between the neck guides, such bottle becomes jammed. Note that bottles may two or more of the following components, from the top: finish (e.g., threaded portion), neck support ring, neck (as in, e.g., a long neck beer bottle), shoulder 57, body 58, heel 59 and base.

Certain bottle shapes may have a greater tendency to jam than others. Bottles with longer necks and shoulder angles 55 smaller than 30° can be prone to excessive swinging and resultant jamming. Thin, lightweight plastic bottles, with their easily deformed sides, can deform often when their swinging is so large that a part of the bottle (e.g., an upper part of a bottle shoulder 57) is swung up between the neck guides, which can then deform the bottle, which then can become wedged such that the conveying force (e.g., pressurized air) cannot move the wedged bottle.

But excessive swinging is not the only swing-related problem observed during bottle conveyance. Chatter—or a repeated, minor (e.g., less than 5°) forward and/or rearward swinging of bottles; and/or repeated small jumping of bottles—while typically not causing a jam, can cause excessive noise, undesired vibration, excessive equipment and bottle wear, and/or a compromise in bottle control and positioning. Unlike the excessive swinging problem mentioned above, chatter typically is not caused by collisions between bottles (whether slug(s) or single bottle). It is often of high frequency; it may at times be caused perhaps by a resonance due to a complex interplay of speed, bottle shape and size, bottle speed, neck guide positioning, and/or nature and location of conveying force. Regardless, it is undesired.

One approach to resolving the issues of excessive swinging, and chatter, may be to allow a certain medium amount of swinging of the bottles (e.g., a swinging that is between that exhibited by chatter and that which causes jamming). While certain embodiments of the inventive technology disclosed herein may be more effective at reducing one problem more than the other (e.g., more effective at reducing jams from excessive swinging instead of excessive chatter), particular embodiments of the inventive technology disclosed herein may seek to mitigate both problems to a degree, perhaps through the use of jam prevention guides that allow swinging between a certain intermediate range (e.g., 10°-20°). In some applications, chatter may not be a problem, or may be acceptable, and embodiments of the inventive technology may merely reduce the incidence of jams caused by excessive swinging.

SUMMARY OF INVENTION

Particular embodiments of the inventive technology seek to mitigate the problem of bottle jamming 1 due to excessive swinging of bottle(s) during conveyance with a pair of jam prevention guides 15, 16, each on a different side of the conveyed bottles, each extending parallel with the bottles' direction of conveyance, each below neck guides, and each having an outer surface that is rotatable, whether that surface spins freely (and perhaps only in response to an applied force, such as that applied by a bottle that has reached a certain swing angle 51 from vertical), or is forcibly rotated (e.g., by a motor, whether continuously or only when a jam or incipient jam is sensed). Often, though not necessarily, such "dynamic rails" are positioned so that they are at a shoulder height of bottles conveyed between them. Provision of any such rotatable surface as part of a dynamic rail can help to force a bottle that is swinging excessively 3 (or starting to so swing) in an opposite swing direction (i.e., towards a 0° swing angle, where the bottle is vertical). The goal may not be to reorient the bottle so that it is conveyed with absolutely no swing, but instead only to return any bottles that are swinging at more than a maximum allowable swing angle back to any orientation having that or a smaller swing angle; indeed, some degree of swinging is allowable, and even at times preferred so as to prevent "chatter" during conveyance.

There are, of course, many different bottles sizes and shapes; often, each run of the conveyor is for a single bottle size/shape. While many such sizes/shapes may indeed benefit from jam prevention guides (due to prevention of jamming and/or chatter), bottles of certain sizes/shapes may not need any sort of guide to prevent jams from excessive swinging because, e.g., the upper portion of the bottle alone prevents swinging (e.g., a short, pronounced, sideways "U" shaped neck and/or a shoulder angle that is greater than 30° may alone prevent excessive swinging, thereby preventing jamming). Short necks may also prevent the delicate finished end (cap end) from hitting the deck 2 as a result of lifting of the bottle, which may perhaps be associated with excessive swinging. Other shapes may benefit from a guide that does not have a rotatable outer surface, where that guide, upon positioning at a proper height and width relative to a bottle conveyed therebetween, acts to deflect bottles that are starting to swing excessively back to within an acceptable swing range (e.g., 10-20° off-vertical). Indeed such stationary jam prevention guides (i.e., stationary because outer surfaces thereof are not rotatable), properly positioned are within the ambit of the inventive technology.

Possible advantages of certain of the various embodiments of the inventive technology may include: increased operational efficiency (due to reduction in incidence in jams); elimination/reduction of chatter and the aforementioned problems associated with it; improvement in operational confidence in ability to meet bottle processing orders; reduction in wear on equipment and/or bottles; reduction in labor costs associated with clearing jams; more tolerant bottle processing queueing and planning (e.g., allowance of more slugs); increase in number of bottle shapes that can be reliably processed by a facility increase in conveyed bottle speed; and/or reduction in extent to which different bottle runs (and the different bottle shapes of such runs) require customized guide set up from one bottle shape/size to another.

BRIEF DESCRIPTION OF THE FIGURES

FIG. 2A shows a front/rear view of a conveyed bottle apparatus conveying bottles without any jam prevention guides. The bottles have longer necks and shoulder angles under 30°, and thus are more susceptible to excessive swinging (excessive swing angle) and jamming.

FIG. 2B shows a side view of the conveyed bottle apparatus of FIG. 2A; it shows an excessive swing that can result in bottle jamming 1, and an instance of the finish end hitting the deck 2 above the conveyed bottles.

FIG. 3A shows a front/rear view of a conveyed bottle apparatus and a bottle undergoing extreme swing (and resultant jam 1).

FIG. 3B shows a side view of the conveyed bottle apparatus of FIG. 3A; it shows slugs that have collided, and the extreme swings—and wedge-type jams 1—that may result therefrom.

FIG. 4A shows a front/rear view of the conveyed bottle apparatus of FIGS. 3A and 3B, but with shoulder guides 8 that are not positioned to adequately prevent excessive swinging and resultant jamming. It shows a bottle undergoing swinging that is extreme enough to cause deformation of the bottle between the shoulder guides, and a resultant jam 1.

FIG. 4B shows a side view of the conveyed bottle apparatus of FIG. 4A. It shows how the shoulder guides may mitigate the problem of extreme swinging somewhat, but that swinging that is still extreme enough to cause bottle deformation, and thus wedge-induced jamming, may occur.

FIG. 15A shows a cross-sectional view of two jam prevention guides as appears in certain embodiments of the inventive technology; it shows an outer annulus around a central shaft.

FIG. 15B shows a cross-sectional view of two jam prevention guides as appears in certain embodiments of the inventive technology; it shows a hollow single shaft as the jam prevention rail.

FIG. 15C shows a cross-sectional view of two jam prevention guides as appears in certain embodiments of the inventive technology; it shows an outer annulus that is loosely established around a central shaft, as may be found, e.g., in certain free-spinning embodiments of the inventive technology.

FIG. 15D shows a cross-sectional view of two jam prevention guides as appears in certain embodiments of the inventive technology; it shows a solid, single shaft as the jam prevention guides. Guides shown in FIGS. 15A-D are merely exemplary, and not exhaustive of guides that may be used in accordance with embodiments of the inventive technology.

DETAILED DESCRIPTION OF THE PREFERRED EMBODIMENTS

Figure 1A:
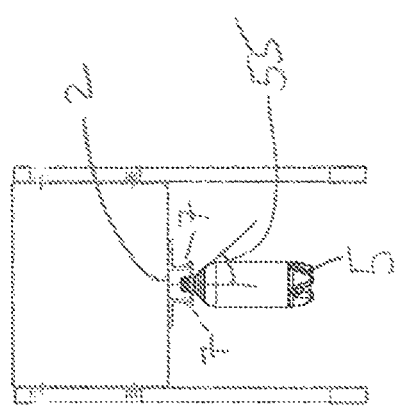
FIG. 1A shows a front/rear view of a conveyed bottle apparatus conveying bottles that that self-limits swinging due to short neck and shoulder with angle greater than 30° (as shown,42°); due to their slope, bottles cannot be swung so much that they are pushed up between neck guides.
Figure 1B:
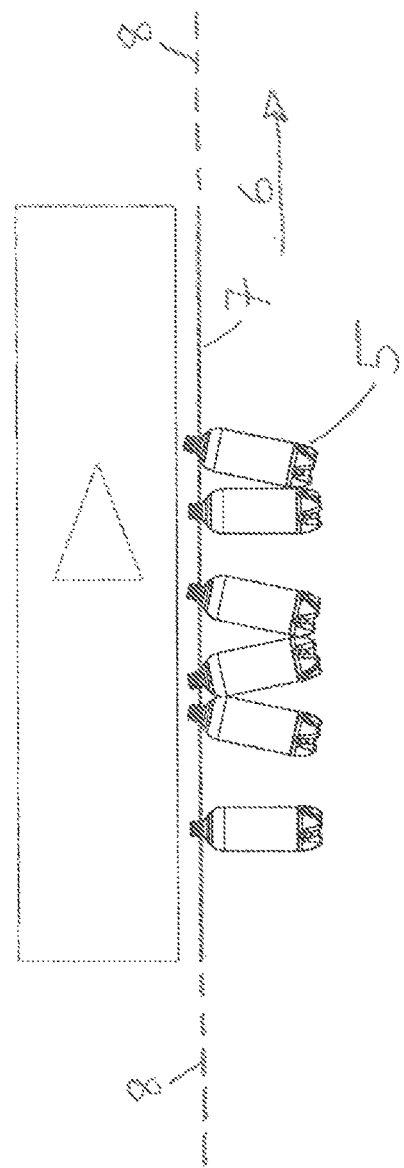
FIG. 1B shows a side view of the conveyed bottle apparatus of FIG. 1A (showing a bottle). The short neck prevents bottles from being lifted up (said lift perhaps in response to a collision with other bottle(s) and/or as a result of excessive swinging) so high (or being rotated so much) that their finish end hits the bottom of the deck above them.
Figure 5A:
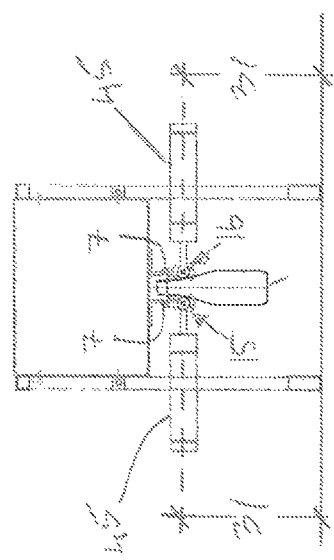
FIG. 5A shows a front/rear view of a conveyed bottle apparatus, with rotatable jam prevention guides (here, free-spinning guides), in accordance with particular embodiments of the inventive technology.
Figure 5B:
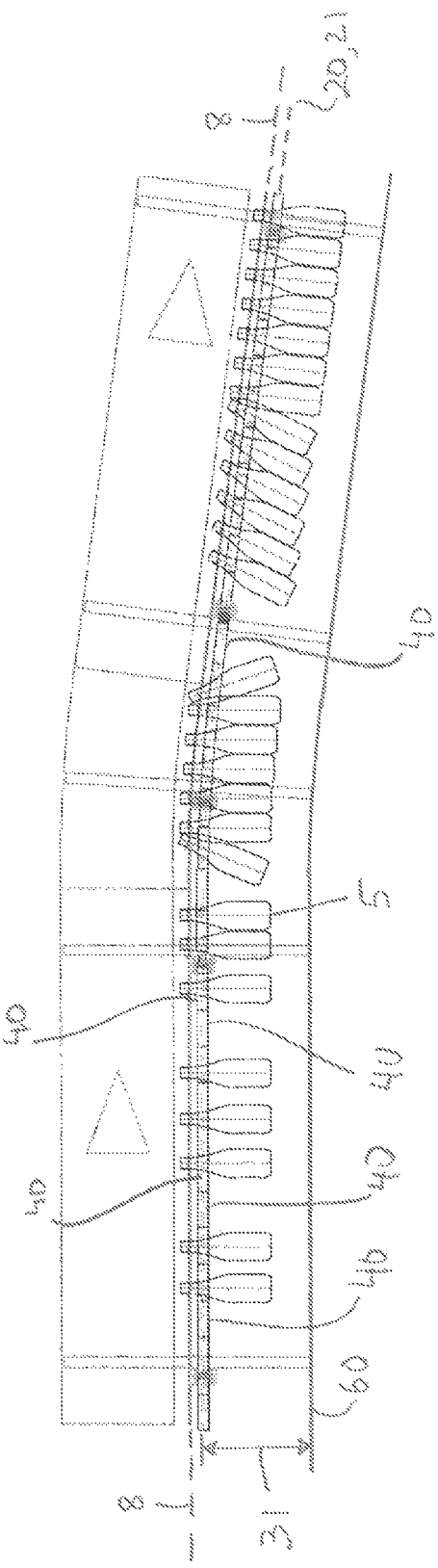
FIG. 5B shows a side view of the conveyed bottle apparatus of FIG. 5A in accordance with particular embodiments of the inventive technology. It shows how slugs similar to those of FIGS. 3A, 3B, 4A and 4C, while still colliding, do not cause swing that is so large that the easily deformed bottles become wedged between the neck guides. Instead, as a bottle (e.g., a shoulder thereof) is forced between the jam prevention guides, the jam prevention guides rotate freely, and the deformed bottles spring back downward, limiting swing angle and avoiding the jams that can result.
Figure 6:
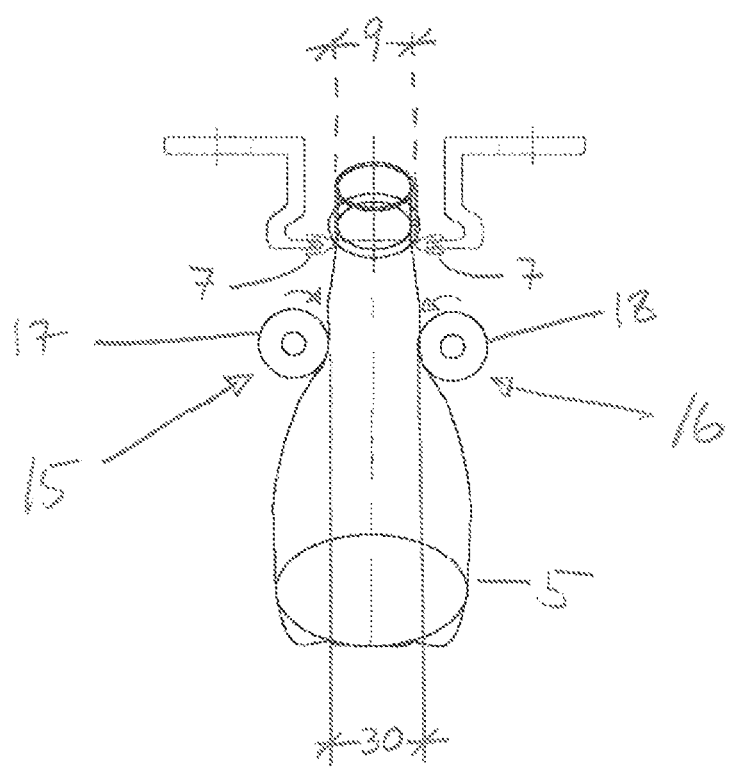
FIG. 6 shows a front/rear view of a conveyed bottle apparatus in accordance with particular embodiments of the inventive technology; it shows a bottle that has swung moderately, but that has at some point hit the jam prevention guides on both sides of the bottle (at the shoulder), and deforms slightly and is sprung back, without any jamming (between the neck guides or the jam prevention guides). It shows the directions in which the outer surfaces of the guides spin during a majority portion of their spin during a jam prevention event (note that initial spin, during the initial part of the contact of the bottle with the guides may be in directions that are opposite those shown).
Figure 7:
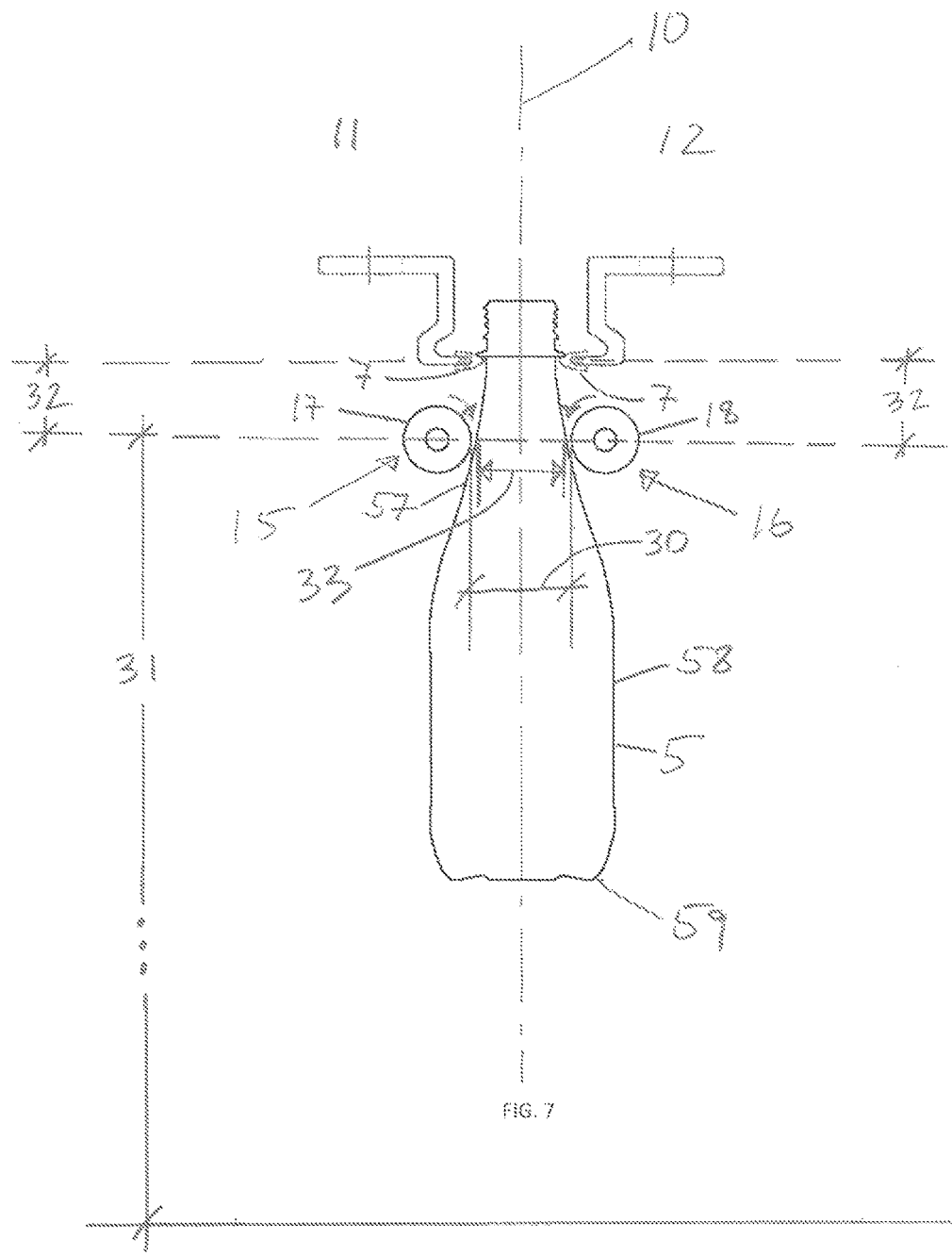
FIG. 7 shows a front/rear view of a conveyed bottle apparatus in accordance with particular embodiments of the inventive technology. It shows the direction of rotation of the jam prevention guides in certain continuous rotation motor-power embodiments (free spinning embodiments would not be spinning in FIG. 7 because there is no contact between the bottle and the dynamic rails (because any bottle swinging in FIG. 7 is either non-existent or too small)).
Figure 8:
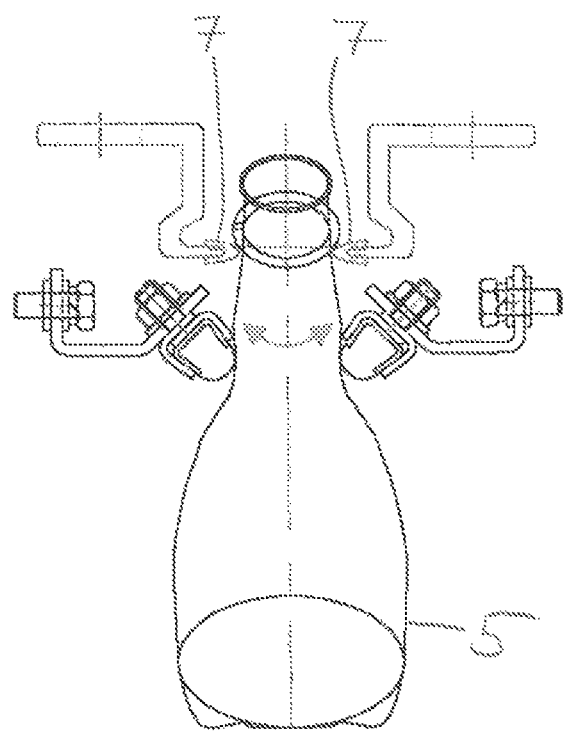
FIG. 8 shows a front/rear view of a conveyed bottle apparatus with a static/stationary shoulder guide that is positioned such that, if a bottle swing is extreme enough, the elastic force of the bottle combined with the friction of the shoulder guide may cause the bottle to stick between the guides.
Figure 9:
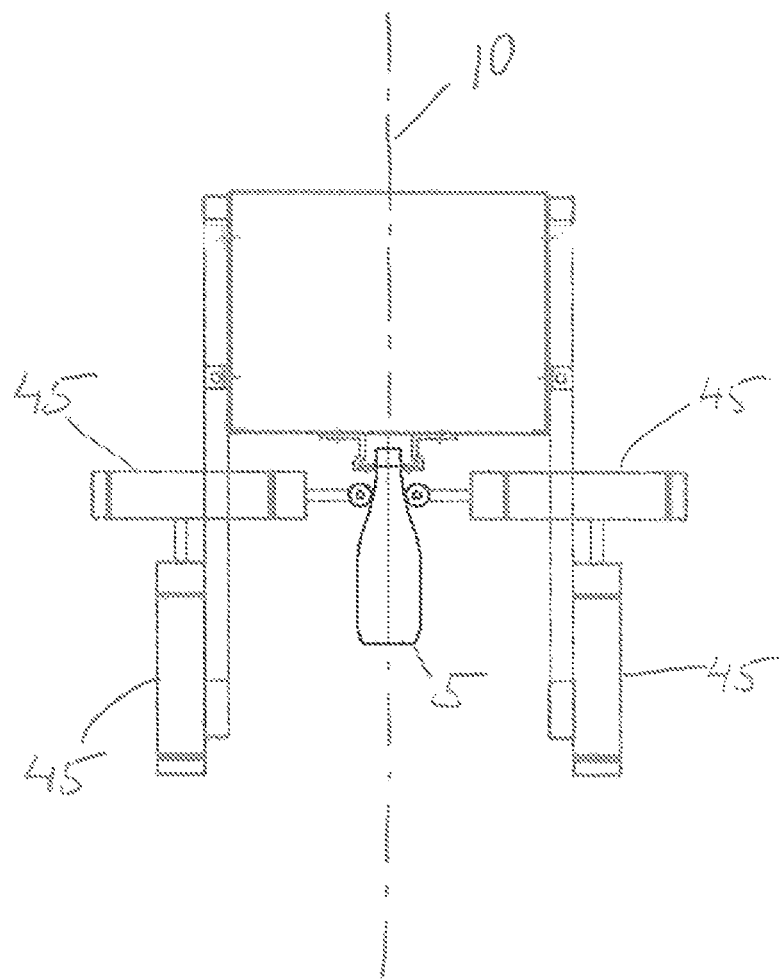
FIG. 9 shows a front/rear view of a conveyed bottle apparatus in accordance with particular embodiments of the inventive technology; it shows dual axis, pneumatic positioners (e.g., as disclosed in U.S. Pat. No. 8,132,665, hereby incorporated herein by reference) that can be used to easily adjust the vertical and horizontal position of the jam prevention guides, when required (note that one position of the jam prevention guides may be adequate for bottles of different shapes; adjustment, whether automatic or otherwise, may still be required for large enough variations in bottle size).
Figure 10:
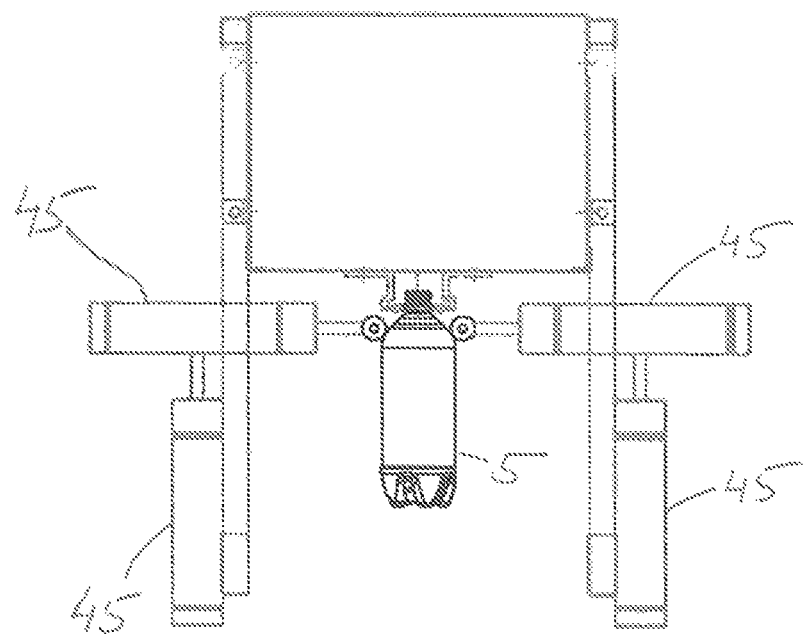
FIG. 10 shows a front/rear view of a conveyed bottle apparatus, conveying a bottle that has a different shape from that shown in FIG. 9, in accordance with particular embodiments of the inventive technology.
Figure 11:
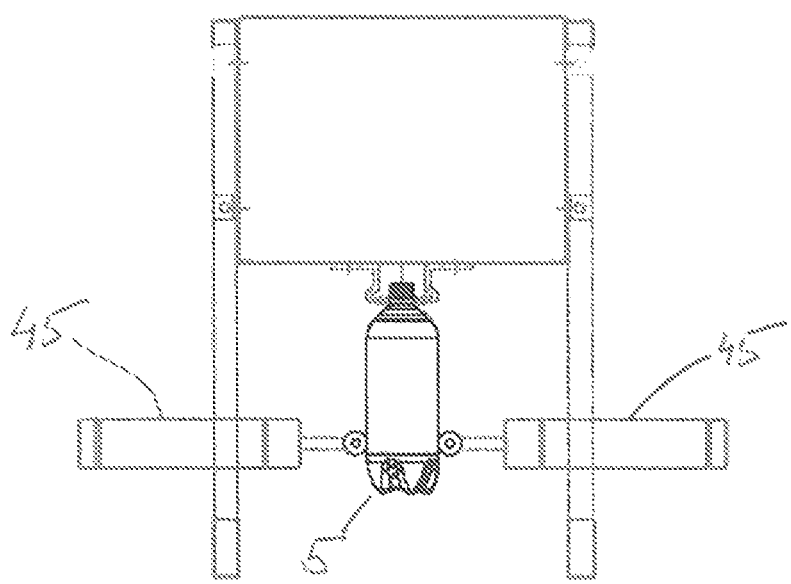
FIG. 11 shows a front/rear view of a conveyed bottle apparatus in accordance with particular embodiments of the inventive technology; it shows how the jam prevention guides may be used on parts of the bottle other than a shoulder (e.g., at the base of the body, as shown) to achieve desired effect of preventing jams.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Certain embodiments of the inventive technology—a conveyed bottle guide apparatus—may include parallel neck guides established (e.g., positioned, secured, oriented, and/or shaped) so as to support bottles 5 singulated therebetween and to guide the bottles in a forward direction 6. The parallel neck guides 7 may have longitudinal neck guide axes 8 that are parallel with the forward direction; the guides have a neck guide width 9 between them. The bottles may hang from the neck guides as they are propelled, e.g., pneumatically via pressurized air that is impelled against a rearward portion of the bottles so as to move them in the forward direction. Note that the inventive technology may be applied not only to pneumatic propulsion conveyance systems, but also to conveyance systems with other propulsion systems.

Additionally, while preferred embodiments apply to bottle conveyance systems, certain embodiments disclosed herein may also find application to systems that convey certain other discrete items.

A nominal central vertical plane 10 may be conceptualized as being positioned halfway between the parallel neck guides for clarity of description reasons. Such neck guides may be established equidistant from that central vertical plane 10, with a first of the neck guides established on a first side 11 of the central vertical plane 10 and a second of the neck guides established on a second side 12 of the central vertical plane that is opposite the first side. Note that all distances from the central vertical plane are horizontal, and normal to that plane, as indeed are all widths.

Jam prevention guides may be central to embodiments of the inventive technology. They may include a first jam prevention guide 15 below the parallel neck guides and on the first side of the central vertical plane, and a second jam prevention guide 16 established below the parallel neck guides and on the second side of the central vertical plane. With respect to dynamic rails, the first jam prevention guide may have a first guide outer surface 17 that is rotatable about a first guide axis of rotation 20 and the second jam prevention guide may have a second guide outer surface 18 that is rotatable about a second guide axis of rotation 21; such axes of rotation may be parallel with the forward (bottle conveyance) direction. Note that regardless of how the outer surface is rotatable (whether driven by a motor, or free-spinning), and regardless of whether a guide, in cross-section, is a single shaft 26, or is instead, one our more annulus/annuli 24 that can rotate (whether driven by a motor or free-spinning) about a central (inner) shaft 25, the guide has an outer rotatable surface. So an outer surface is said to rotate, even where other parts of the guide (e.g., an outer annulus, or the entire remainder of the guide, in cross-section) also rotate with it. The guide itself is also said to be rotatable even where, e.g., only an outer annulus of the guide rotates, and even only when made to rotate by an external force, or when forced to rotate via a motor (whether continuously or only when a jam or incipient jam, or chatter, is sensed). And even where a jam prevention guide is rotatable in only one direction (e.g., such that its outer surface closest to the bottle moves downward), such is a rotatable jam prevention guide. If it can freely spin in only one direction, it is also free spinning; it if can be motor-rotated in only one direction, it still is motor driven. In free-spinning designs, where a central shaft and outer annulus is used, the outer annulus may have an interior radius that is large enough such that the outer annulus rotates easily around the central shaft. Ball bearings may also/instead be used to allow for an easy spinning outer annulus.

As mentioned, the first jam prevention guide and the second jam prevention guide may define a jam prevention guide width 30 between them, and may each be equidistant from the central vertical plane. The jam prevention guides (here, their respective axes) are at a jam prevention guide height 31 (above some underlying surface 60, such as the facility floor, or some other surface underlying the conveyed bottles). That jam prevention guide height is a jam prevention guide distance 32 below the neck guides. At that jam prevention guide height, the bottles (when not swinging) have a bottle width 33. The jam prevention guides may be configured so that the jam prevention guide width is at least as large as that bottle width. In particular embodiments, the jam prevention guides are configured so that the jam prevention guide width is greater than the bottle width (at the jam prevention guide height), is at least 101% the bottle width but no greater than 140% the bottle width, at least 101% the bottle width but no greater than 120% the bottle width, or at least 101% the bottle width but no greater than 110% the bottle width, as but a few possible ranges. Configured as used herein may include positioned, shaped, established, structured and/or designed.

The rotatable jam prevention guides (i.e., dynamic rails) may each be free-spinning or instead may be forcibly rotated (e.g., by at least one motor). In free-spinning designs, the outer surface 17 may freely spin in both directions (clockwise and counter-clockwise), or only in one of two directions (e.g., in a direction that forces the bottles downward, as may be seen with a ratchet and pawl design). In either design, the guides, in cross-section that is perpendicular to conveyance direction, may show a central shaft 25 and outer allulus/annuli 24, or may be a single shaft 26. Note that a single shaft or central shaft may be hollow, of concentric layers, shelled, etc. as long as all layers/shells rotate together. Like central shaft/annular designs, a single shaft design 25 (whether hollow or solid) may rotate in response to a motor drive, or may rotate freely.

In designs where the jam prevention guides are each forcibly rotated by at least one motor (and its drive (e.g., cable, chain, etc.)), they may rotate continuously or they may rotate only at certain times, e.g., they may start to rotate when a sensor (e.g., a photo-eye) detects a jam or an incipient jam, and perhaps stop rotating when the swing of the bottle(s) has reduced to within an acceptable range (e.g., 10-20° off-vertical).

In embodiments where the jam prevention guides each comprise a central shaft 25 and an outer annulus 24 around the central shaft, the outer annuli may be a sleeve 35 (e.g., roller). It may be made of any of a variety of materials, e.g., UHMW polyethylene, at least in part. In segmented designs, several of such outer annuli may be thread onto a single central shaft.

Often, as mentioned, rotatable jam prevention guides may include a central shaft(s) 25 and outer annulus/annuli 24 that are rotatable about the central shaft(s) 25. Particularly in free spinning embodiments, the central shaft may be stationary while the outer annulus/annuli may be free-spinning; outer annuli may perhaps be segmented along their respective axis of rotation (of the guides they form at least a part). Segments 40 may be any of a variety of lengths (e.g., 4", 2", 6", 8" as but a few examples), but typically are shorter in length than central shafts. Such segmenting may allow for independent rotation of a segment (i.e., where an external force, such as a bottle undergoing excessive swing, may cause rotation of one segment but not of neighboring segments). Note that if the only separations between outer annuli are at positioners or drives (where such may make contact with the central shaft to re-position or rotate it), then such design is not considered segmented (such design is still, however, within the ambit of the inventive technology). Often, in segmented designs, several sleeves, each a segment, may be threaded along a single central shaft. Positioners 45 may directly position the central shaft, and thus the outer annulus around it (whether segmented or not); such positioners (and motor drives) may appear as necessary to properly position the guides. Several single shafts may be used in a system (substantially end to end), each with several segments outside of that shaft. Motor drives may directly drive the central shaft, and thus the outer annulus around it (whether segmented or not)

Figure 12:
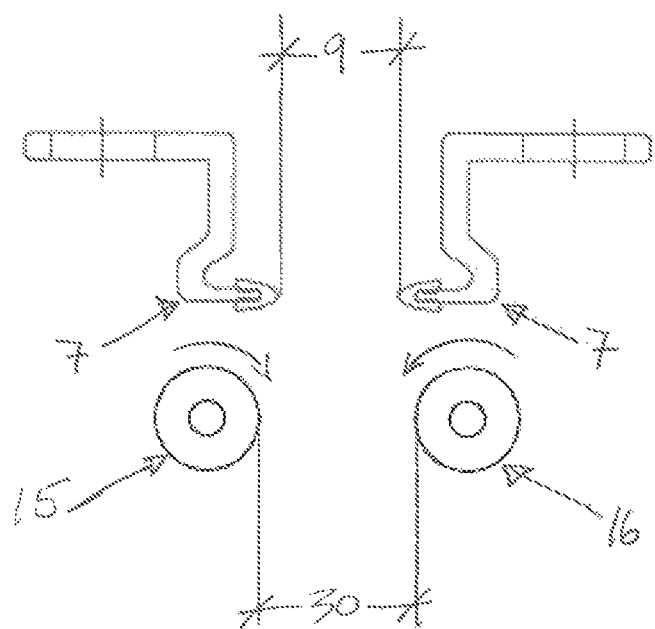
FIG. 12 shows a front/rear view of a conveyed bottle apparatus in accordance with particular embodiments of the inventive technology; bottle(s) have been removed for clarity reasons. It shows the direction of rotation of the jam prevention guides in certain continuous rotation motor-power embodiments; the indicated direction is also the direction of certain free spinning guide embodiments after perhaps an initial amount of spinning (when the bottle should first enters between the guides) in the opposite direction.
Figure 13:
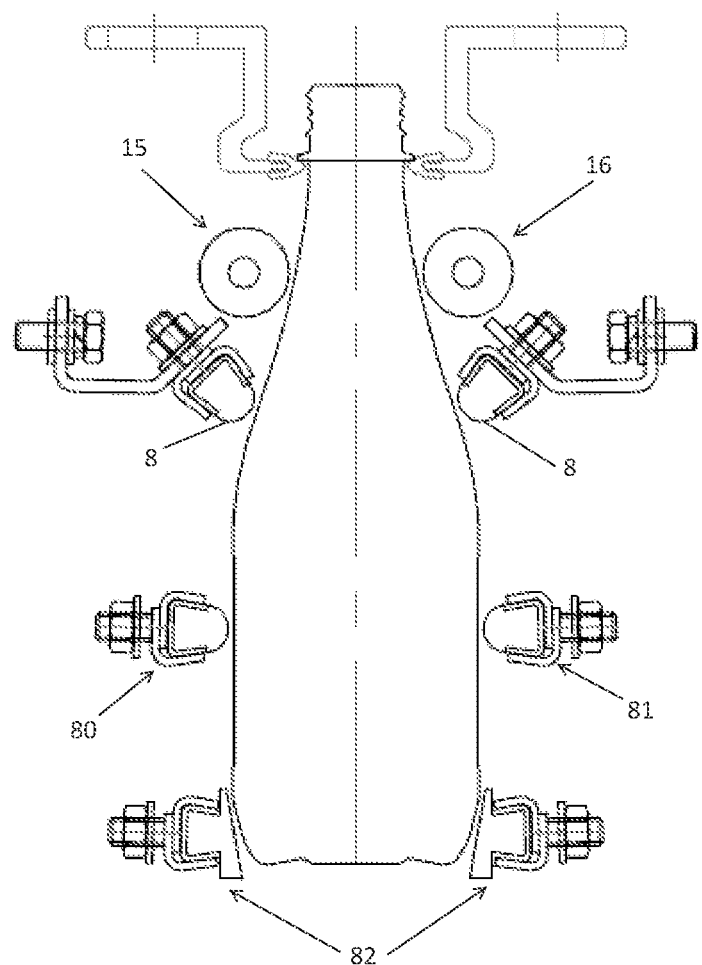
FIG. 13 shows a front/rear view of a conveyed bottle apparatus in accordance with particular embodiments of the inventive technology; it shows, from top to bottom, neck guides, jam prevention guides, shoulder guides, body guides, and heel guides 82.
Figure 14:
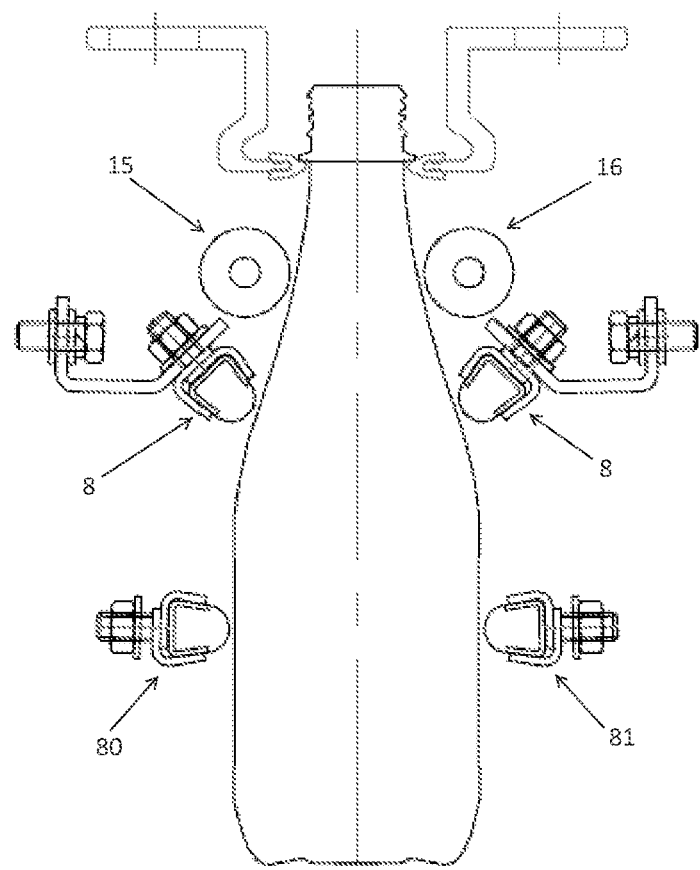
FIG. 14 shows a front/rear view of a conveyed bottle apparatus in accordance with particular embodiments of the inventive technology; it shows, from top to bottom, neck guides, jam prevention guides, shoulder guides, and body guides.
Figure 16:
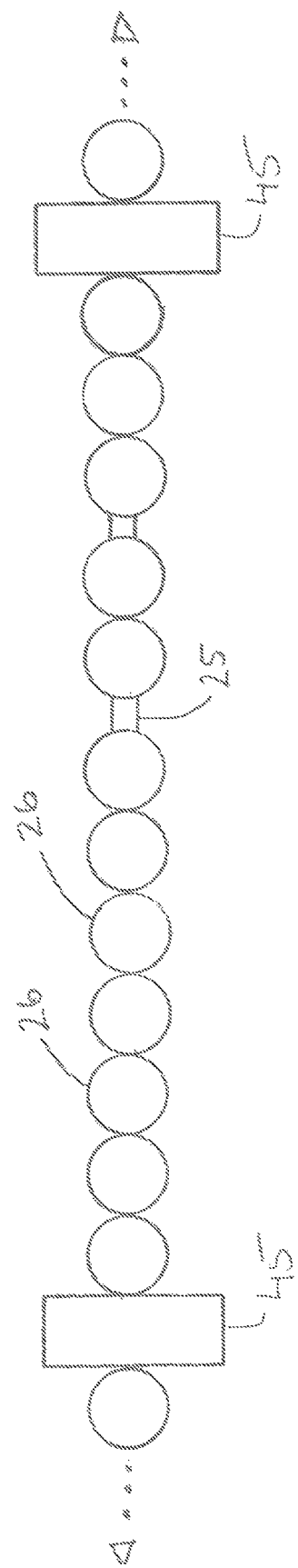
FIG. 16 shows a side view of a jam prevention rail as appears in certain embodiments of the inventive technology; it shows a rail made up of a central shaft and a plurality of free-spinning beads established around that shaft.
Figure 17:
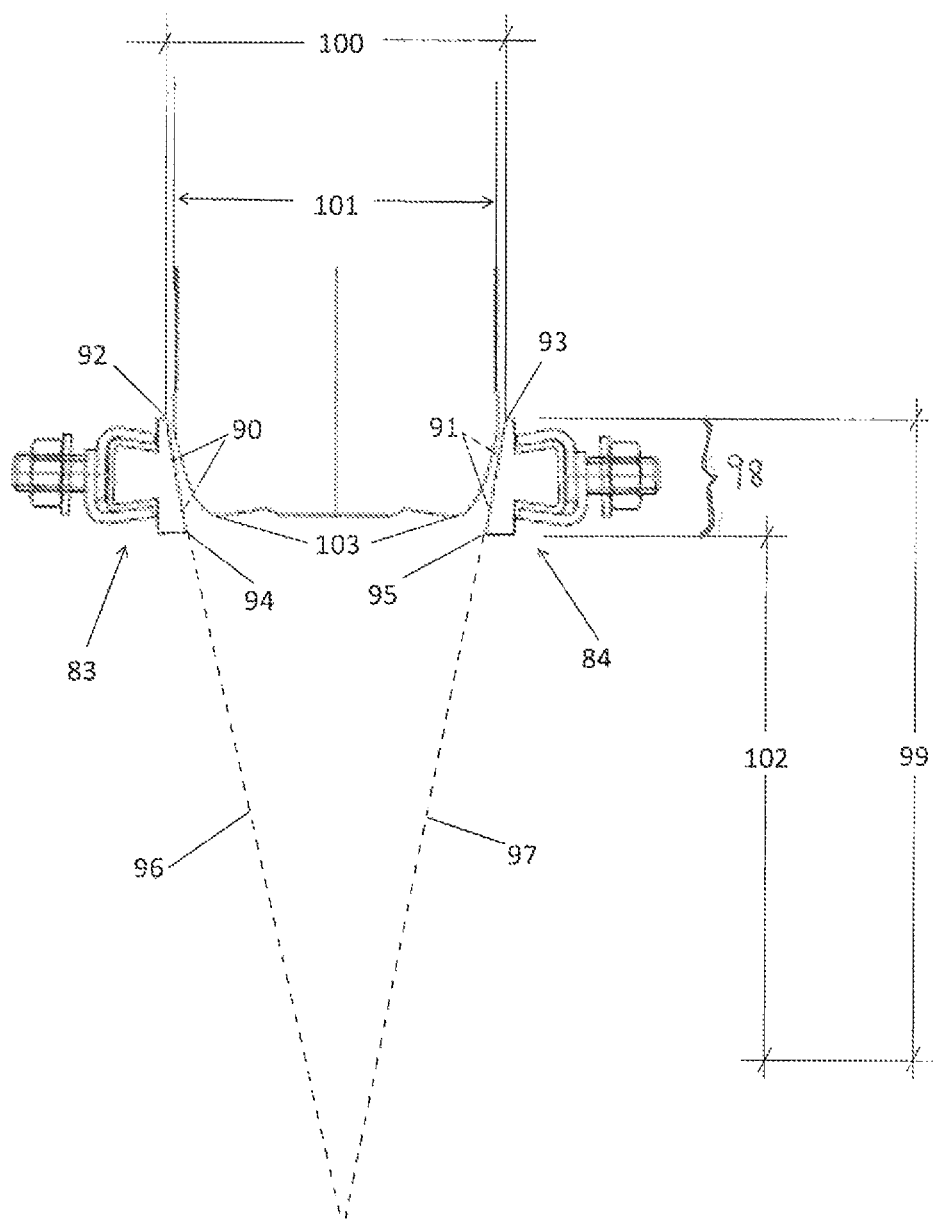
FIG. 17 shows a side view of heel guides as appears in certain embodiments of the inventive technology.

In certain designs, the central shafts 24 may each be forcibly rotated by at least one motor, and the outer annulus/annuli 24 each rotate with a respective one of the central shafts. The motor(s) may directly drive the central shaft, in particular embodiments. Such rotation may then cause rotation of outer annuli with respect to a respective one of the central shafts (either the shaft of the first jam prevention guide or the second jam prevention guide) due to e.g., friction between each of the outer annulus and that central shaft (see, e.g., FIG. 15A). Such rotation may be, e.g., in a downward direction (where bottles would contact the outer surface of the jam prevention guides) that would urge bottles that contact the outer surface of the guides downward, and away from a jamming position (or an incipient jamming position). In certain embodiments, that friction can be overcome and an outer annulus will cease to rotate with the central shaft that it is around if an external, non-motor force applied to the outer annulus is larger than a threshold force. Accordingly, rotation may cease where a hand is placed between the guides, possibly preventing serious injury. Also, such allowance of relative rotational motion at higher externally applied forces may also prevent destruction of bottles. In response to an external force, a free-spinning guide may, perhaps initially, at guide contact with bottle, show rotation in an upward direction, but after that, may show rotation in a downward direction (see, e.g., FIG. 12). Note that other designs may use, e.g., ball bearings, may be used between a driven central shaft and an annulus therearound it (for either the free-spinning or motor driven designs).

Other known guides may be used in conjunction with the inventive jam prevention guides disclosed herein. For example, a first body guide 80 on the first side of the central vertical plane, and a second body guide 81 on the second side of the central vertical plane, may be positioned below the jam prevention guides. Shoulder guides 8 and/or heel guides 82 may also be used. However, use of any of such known guides is not required where jam prevention guides are used. Any of the guides, including the jam prevention guides, may be independently adjustably positioned (with respect to height and/or horizontal position in a plane that is perpendicular to conveyance direction) using any known positioners. It is also of note that jam prevention guides, depending on the application (including the bottle size) may possibly achieve intended goals at a variety of positions (including perhaps within the lower half of the bottle, even at its lowest portions).

Because of the many different shapes of bottles, there may be no rigid formula usable to determine the optimal positioning of the dynamic jam prevention guides relative to bottles conveyed between them. However, it is a simply matter for a conveyor system operator to determine which positions are effective in achieving the desired goal(s)—prevention or at least reduction of incidence of jamming and/or prevention or at least reduction of incidence of chatter. Simply, a few experiments can be conducted for any given bottle shape; those positions having the desired effect can then be implemented system-wide for that bottle. Often, a bottle exhibits a shoulder (substantially below a bottle neck and above a body of the bottle); placement of the dynamic rails so that, during "swing-free" operation, they are at a height that falls within the shoulder of the bottle and 2-6 mm away from the bottle's shoulder may meet desired goal(s). Of course, at whichever height the guides are placed, bottles conveyed (during swing-free operation) will have a certain bottle width 33; the distance between the guides (e.g., jam prevention guide width 30) must be at least that width (often, the dynamic rail width will be slightly larger, e.g. 4-12 mm than the bottle width so as to avoid excessive bottle wear from constant rubbing of the bottles with the guides during bottle transport). Generally, the distance between dynamic rails may be within the following range: greater than the bottle width at the height of the guides, but less than 140% that bottle width. A variety of height and width combinations (of the dynamic rails) may achieve desired goals(s). Note that below includes directly below and merely at a lower height (including not directly below, as where a view from above would show both parts in their entirety).

Novel and non-obvious methods are also part of the inventive technology. Certain embodiments, for example, may be described as a conveyed bottle guide method, comprising the steps of establishing parallel neck guides so they are equidistant from a central vertical plane that is halfway between the neck guides, so as to support bottles singulated between the neck guides, to guide the bottles in a forward direction, and so that longitudinal neck guide axes defined by the neck guides are parallel with the forward direction. As mentioned, the neck guides defining a neck guide width between them. Additional steps of certain embodiments may include: establishing a first jam prevention guide below the parallel neck guides, on a first side of the central vertical plane, a certain horizontal distance from the central vertical plane, and at a jam prevention guide height; establishing a second jam prevention guide below the parallel neck guides, on a second side of the central vertical plane that is opposite the first side, and at said certain horizontal distance from the central vertical plane, at a jam prevention guide width from the first jam prevention guide, and at the jam prevention guide height. The method may further compromise configuring the first jam prevention guide to have a first guide outer surface that rotates about a first guide axis of rotation that is parallel with the forward direction, and configuring the second jam prevention guide to have a second guide outer surface that rotates about a second guide axis of rotation that is parallel with the forward direction. Note that the jam prevention guide width is at least as large as the bottle width at the jam prevention guide height.

In one embodiment of the inventive technology, the rotatable jam prevention guides may present as a plurality of beads 26 around a central shaft 25 (which could even be a tightly drawn cable, e.g.). In such embodiments, the beads may be fewer in number than can be fit onto a single shaft (i.e., they are not packed tightly on that shaft), thereby affording an additional degree of freedom in the motion of the guide in response to an externally applied force (e.g., as applied by an incipient jam). In other words, in response to such force, beads may move in a forward (in the direction of bottle conveyance) and/or reverse direction. Such additional degree of freedom may provide additional benefits such as, e.g., a more forgiving, wider and more tolerant range of positions of the guides for them to operate effectively in meeting goals of jam prevention, and/or improved jam prevention for certain bottle shapes.

Another aspect of the inventive technology may be described as a heel guide. As relevant background, Body guides are often used to help to guide bottles during conveyance for processing. Whether alone or as a supplement to shoulder and/or dynamic guides, body guides typically act on the body of the bottle. As one may expect, it may be important that such body—particularly on bottles with clear labels—be scuff-free, or have only minimal scuffing, because of the negative impact such scuffing may have on appearance of such bottles and thus on customer satisfaction, desirability and sale of beverages contained in such bottles. But body guides may cause such scuffing. Embodiments of the inventive technology disclosed herein may seek to avoid such label panel or body scuffing by guiding the bottle with heel guides 90, 91 (that seek to guide the bottle via contact with a bottle's heel), perhaps instead of body guides. Indeed, any scuffing on the heel 82 of the bottle (i.e., substantially at the lower portions of the bottle where the body or side panel transitions to the underlying horizontal "table contacting" surface of the bottle) may be of little or no concern.

Embodiments of the inventive technology may include heel guides that are situated, generally, at a height that coincides with the heel 59 of a conveyed bottle. Instead of presenting with an operative surface 90, 91 (i.e., the surface that is towards the (conveyed) bottles and that may touch a bottles in its various tilts, rotations and positions during conveyance) that can touch the bottle along only at one point (in a two dimensional plane that is perpendicular to a bottle conveyance direction) on the guide, the heel guides may each have operative surfaces that can touch the bottle (as the bottles swing forward or backward, or tilt left or right) over a plurality of points (on the heel guide) in such plane that are of different heights on the heel guide. Accordingly, a heel guide's operative surface 90, 91 may be either straight, or only slightly curved (either concavely (curved towards the bottle), or convexly (curved away from the bottle)), or have a shape showing a mix of straight and such curves.

Whether the operative surfaces 90, 91 (towards the bottle) of the heel guides is straight or not (the heel guide operative surface), those surfaces may be angled (in a downward direction) inwards. Such angling is said to exist where the highest point of a particular heel guide's operative surface is at a highest operative surface point (92 is a first operative surface highest point for a first heel guide on a first side of the central vertical plane; 93 is a second operative surface highest point for a second heel guide on a second side of the central vertical plane) in a plane perpendicular to the direction of bottle conveyance, the lowest point of the heel guide surface towards the bottle is at an operative surface lowest point (94 is a first operative surface lowest point for first heel guide; 95 is a second operative surface lowest point for second heel guide) in that plane, and a line 96, 97 drawn to include such two points (for each heel guide, the highest and the lowest points) intersects the central vertical plane, and each other, below the bottle. The portions of such lines for both heels (one on either side of the central vertical plane) above and including their intersection may form a "V" shape. Note that such lines (that each include the highest and lowest points of the operative surface for each heel guide) may or may not include (i.e., have a part that coincides with) the actual operative surface of the heel guides. They will if such surfaces are straight, but will not if they are curved (as would be seen, e.g., in a slightly concave (curved towards the bottle) or a slightly convex (curved away from the bottle) actual heel guide surface shape), or a mix of curved and straight. It is of note also that another way of characterizing the above aspect of the inventive technology may be that the distance between the highest points of the first and second operative surfaces is less than the distance between the lowest points of the first and second operative surfaces; each operative surface may be straight and/or slightly curved (concave or convex) between its highest and lowest points.

Certain embodiments of the inventive heel guide technology may contact the bottle at an off-vertical section at a bottom portion of the bottle, where the side panel transitions from vertical to the horizontal base portion (such transition portion termed the heel), or at the very top of that heel section. Note that such heel guides are typically used in place of body guides (e.g., that contact the bottle only on the body panel), thereby avoiding the scuffing that body guides may cause, although this is not a required feature of application of the inventive technology.

Note that heel guides may be used in conjunction with any other guides, although, again, they often act to replace body guides (for the above scuffing-related reasons). However, in certain applications, scuffing may not be a concern, and the conveyed bottle positioning/guiding function of heel guides may inform their use as a supplement to body guides. Heel guides may find use in a system with neck guides, and possibly even with one or more of the following: shoulder guides, body guides (even more than one set), and jam prevention guides.

Certain embodiments of the heel guide related inventive technology may be described as a conveyed bottle guide apparatus may comprise:

parallel neck guides 7 established so as to support bottles singulated therebetween and to guide said bottles in a forward direction 6, said parallel neck guides having longitudinal neck guide axes 8 that are parallel with said forward direction and defining a neck guide width 9 between them;
a central vertical plane 10 halfway between said parallel neck guides, said neck guides established equidistant from said central vertical plane, a first of said neck guides established on a first side of said central vertical plane and a second of said neck guides established on a second side of said central vertical plane that is opposite said first side;
a first heel guide 83 established below said parallel neck guides and on said first side of said central vertical plane;
a second heel guide 84 established below said parallel neck guides and on said second side of said central vertical plane,
a first heel guide operative surface 90 of said first heel guide;
a second heel guide operative surface 91 of said second heel guide;
a first operative surface highest point 92 of said first heel guide operative surface;
a second operative surface highest point 93 of said second heel guide operative surface;
a first operative surface lowest point 94 of said first heel guide operative surface;
a second operative surface lowest point 95 of said second heel guide operative surface;
wherein a first line 96 that includes said first operative surface highest point 92 and said first operative surface lowest point 94 intersects below said bottles,
wherein a second line 97 that includes said second operative surface highest point 93 and said second operative surface lowest point 95 intersects below said bottles,
wherein said bottles comprise heels at a heel height range,
wherein said heel guides are positioned so that at least a portion of each of said operatives surfaces are at said heel height range 98,
wherein said first and second operative surface highest points 92, 93 are at a highest operative surface height 99,
wherein a distance between said first and second operative surface highest points is a greatest operative surface width 100,
wherein said bottle has a bottle width 101 at said highest operative surface height, and said greatest operative surface width is at least as great as said bottle width, and
wherein said first and second operative surface lowest points 94, 95 are at a lowest operative surface height 102 that is below a lowest point of said bottle 103 during bottle conveyance.

Note that the inventive technology, while certainly amenable to implementation as part of a new bottle conveyance system, can be retrofit onto existing systems. Such retrofit may involve the addition of rotatable jam prevention guides, whether as a replacement of other guides, e.g., existing shoulder guides, or not, or possibly as an addition to any other guides.

As can be easily understood from the foregoing, the basic concepts of the present invention may be embodied in a variety of ways. It involves both guiding techniques as well as devices to accomplish the appropriate guidance. In this application, the guiding techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application may be intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "guide" should be understood to encompass disclosure of the act of "guiding"—whether explicitly discussed or not—and, conversely, were there effectively disclosure of the act of "guiding", such a disclosure should be understood to encompass disclosure of a "guide" and even a "means for guiding" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the guide devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A conveyed bottle guide apparatus, comprising:
   parallel neck guides established so as to support bottles singulated therebetween and to guide said bottles in a forward direction, said parallel neck guides having longitudinal neck guide axes that are parallel with said forward direction and defining a neck guide width between them;
   a central vertical plane halfway between said parallel neck guides, said neck guides established equidistant from said central vertical plane, a first of said neck guides established on a first side of said central vertical plane and a second of said neck guides established on a second side of said central vertical plane that is opposite said first side;
   a bottle propulsion system configured to propel said bottles in said forward direction;
   a first jam prevention guide established below said parallel neck guides and on said first side of said central vertical plane; and
   a second jam prevention guide established below said parallel neck guides and on said second side of said central vertical plane,
   wherein said first jam prevention guide comprises a first guide outer surface that is rotatable about a first guide axis of rotation and said second jam prevention guide comprises a second guide outer surface that is rotatable about a second guide axis of rotation;
   wherein said first guide axis of rotation and said second guide axis of rotation are parallel with said forward direction;
   wherein said first jam prevention guide and said second jam prevention guide define a jam prevention guide width between them, and are each equidistant from said central vertical plane;
   wherein said jam prevention guides are at a jam prevention guide height, which is a jam prevention guide distance below said neck guides;
   wherein said bottles have a bottle width at said jam prevention guide height; and
   wherein said jam prevention guides are configured so that said jam prevention guide width is at least as large as said bottle width.

2. A conveyed bottle guide apparatus as described in claim 1 wherein said jam prevention guides are configured so that said jam prevention guide width is at least 101% said bottle width but no greater than 140% said bottle width.

3. A conveyed bottle guide apparatus as described in claim 2 wherein said jam prevention guides are configured so that said jam prevention guide width is at least 101% said bottle width but no greater than 120% said bottle width.

4. A conveyed bottle guide apparatus as described in claim 3 wherein said jam prevention guides are configured so that said jam prevention guide width is at least 101% said bottle width but no greater than 110% said bottle width.

5. A conveyed bottle guide apparatus as described in claim 1 wherein said jam prevention guides are each free-spinning.

6. A conveyed bottle guide apparatus as described in claim 1 wherein said jam prevention guides are each forcibly rotated by at least one motor.

7. A conveyed bottle guide apparatus as described in claim 6 wherein said jam prevention guides rotate continuously.

8. A conveyed bottle guide apparatus as described in claim 6 wherein said guides start to rotate when a sensor detects a jam or an incipient jam.

9. A conveyed bottle guide apparatus as described in claim 1 wherein said jam prevention guides each comprise a central shaft and an outer annulus around said central shaft.

10. A conveyed bottle guide apparatus as described in claim 9 wherein each of said outer annuli is a sleeve.

11. A conveyed bottle guide apparatus as described in claim 9 wherein each of said outer annuli is made of UHMW polyethylene, at least in part.

12. A conveyed bottle guide apparatus as described in claim 9 wherein said central shafts are stationary and said outer annuli are free-spinning.

13. A conveyed bottle guide apparatus as described in claim 12 wherein said free-spinning outer annuli are each segmented along a respective one of said axes of rotation to form at least two segments of each of said jam prevention guides.

14. A conveyed bottle guide apparatus as described in claim 13 wherein said segments are each approximately 4 inches.

15. A conveyed bottle guide apparatus as described in claim 9 wherein said central shafts are each forcibly rotated by at least one motor, and said outer annuli each rotate with a respective one of said central shafts.

16. A conveyed bottle guide apparatus as described in claim 15 wherein said outer annuli each rotate with a respective one of said central shafts due to friction between each of said outer annulus and said respective one of said central shafts.

17. A conveyed bottle guide apparatus as described in claim 16 wherein said friction can be overcome and an outer annulus ceases to rotate with the central shaft that it is around if an external, non-motor force applied to said outer annulus is larger than a threshold force.

18. A conveyed bottle guide apparatus as described in claim 15 wherein said annuli are each segmented along a respective one of said axes of rotation to form at least two segments of each of said jam prevention guides.

19. A conveyed bottle guide apparatus as described in claim 18 wherein said segments are each approximately 4 inches.

20. A conveyed bottle guide apparatus as described in claim 1 wherein said jam prevention guides each comprise a single shaft.

21. A conveyed bottle guide apparatus as described in claim 20 wherein said single shafts each are free-spinning.

22. A conveyed bottle guide apparatus as described in claim 20 wherein said single shafts are each forcibly rotated by a motor.

23. A conveyed bottle guide apparatus as described in claim 1 and further comprising a first body guide on said first side of said central vertical plane, and a second body guide on said second side of said central vertical plane.

24. A conveyed bottle guide apparatus as described in claim 23 wherein said jam prevention guides are above said body guides.

25. A conveyed bottle guide apparatus as described in claim 1 wherein said bottles have a shoulder, and wherein said jam prevention guide height falls within a shoulder of said bottles.

26. A conveyed bottle guide apparatus as described in claim 1 and further comprising a first heel guide on said first side of said central vertical plane, and a second heel guide on said second side of said central vertical plane.

27. A conveyed bottle guide apparatus as described in claim 1 wherein said heel guides are below said jam prevention guides.

28. A conveyed bottle guide apparatus as described in claim 1 further comprising at least one motorized drive configured to rotate said jam prevention guides.

29. A conveyed bottle guide apparatus as described in claim 1 further comprising at least one positioner to position said jam prevention guides.

30. A conveyed bottle guide apparatus as described in claim 1 wherein said first and second jam prevention guides each comprise a plurality of beads.

31. A conveyed bottle guide apparatus as described in claim 30 wherein said beads for said first jam prevention guide is established around a central shaft.

32. A conveyed bottle guide apparatus as described in claim 31 wherein said central shaft comprises a rod.

33. A conveyed bottle guide apparatus as described in claim 32 wherein said central shaft comprises a cable under tension.

34. A conveyed bottle guide method, comprising:
establishing parallel neck guides so they are equidistant from a central vertical plane that is halfway between said neck guides, so as to support bottles singulated between said neck guides, to guide said bottles in a forward direction, and so that longitudinal neck guide axes defined by said neck guides are parallel with said forward direction, said neck guides defining a neck guide width between them;
establishing a first jam prevention guide below said parallel neck guides, on a first side of said central vertical plane, at a certain horizontal distance from said central vertical plane, and at a jam prevention guide height;
establishing a second jam prevention guide below said parallel neck guides, on a second side of said central vertical plane that is opposite said first side, at said certain horizontal distance from said central vertical plane, at a jam prevention guide width from said first jam prevention guide, and at said jam prevention guide height;
configuring said first jam prevention guide to have a first guide outer surface that rotates about a first guide axis of rotation that is parallel with said forward direction;
configuring said second jam prevention guide to have a second guide outer surface that rotates about a second guide axis of rotation that is parallel with said forward direction;
and
propelling said bottles in said forward direction,
wherein said jam prevention guide width is at least as large as said bottle width at said jam prevention guide height.

35. A conveyed bottle guide apparatus as described in claim 1 wherein said bottle propulsion conveyance system comprises a pneumatic bottle conveyance system.

* * * * *